Patented Dec. 16, 1924.

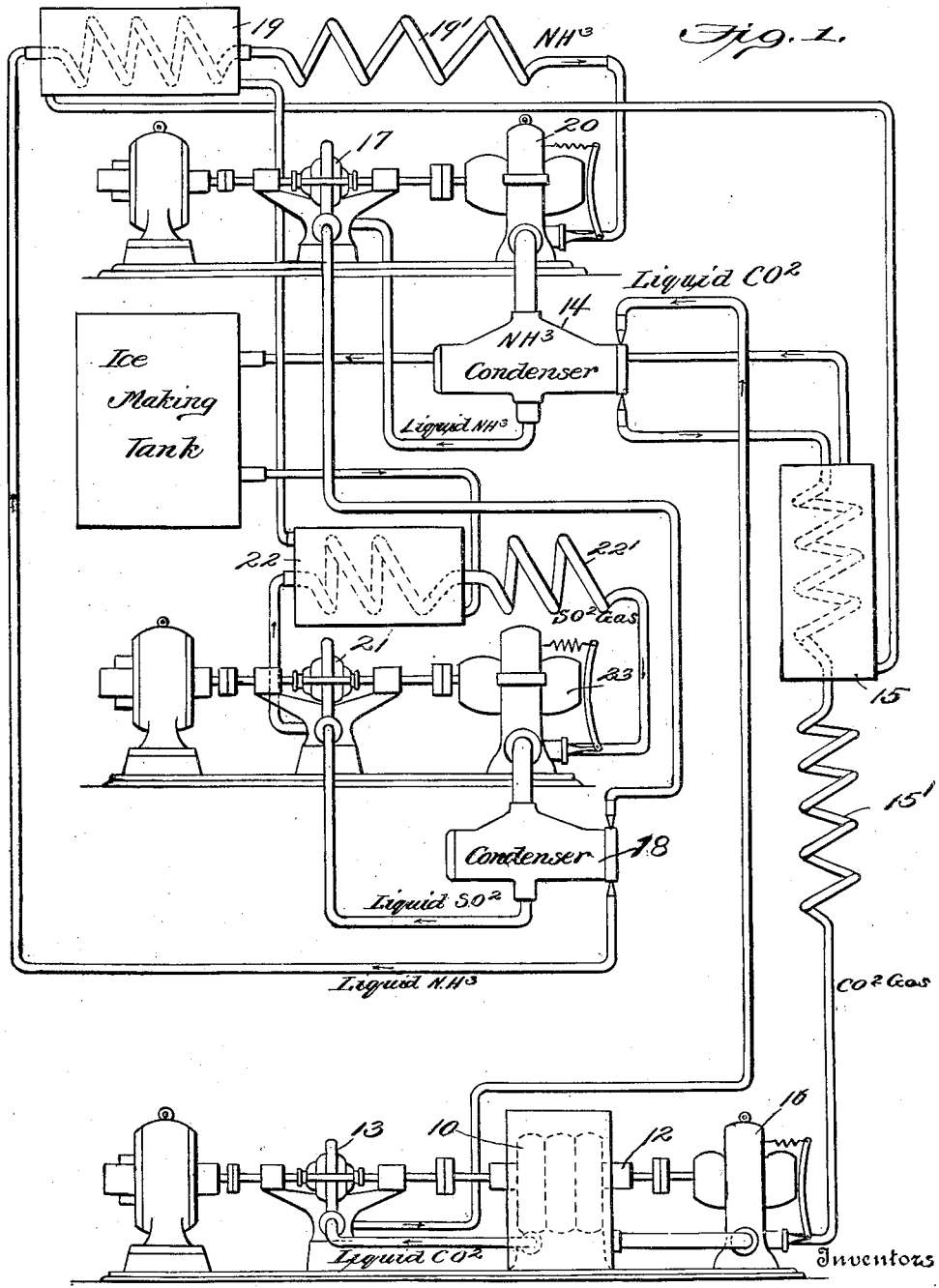

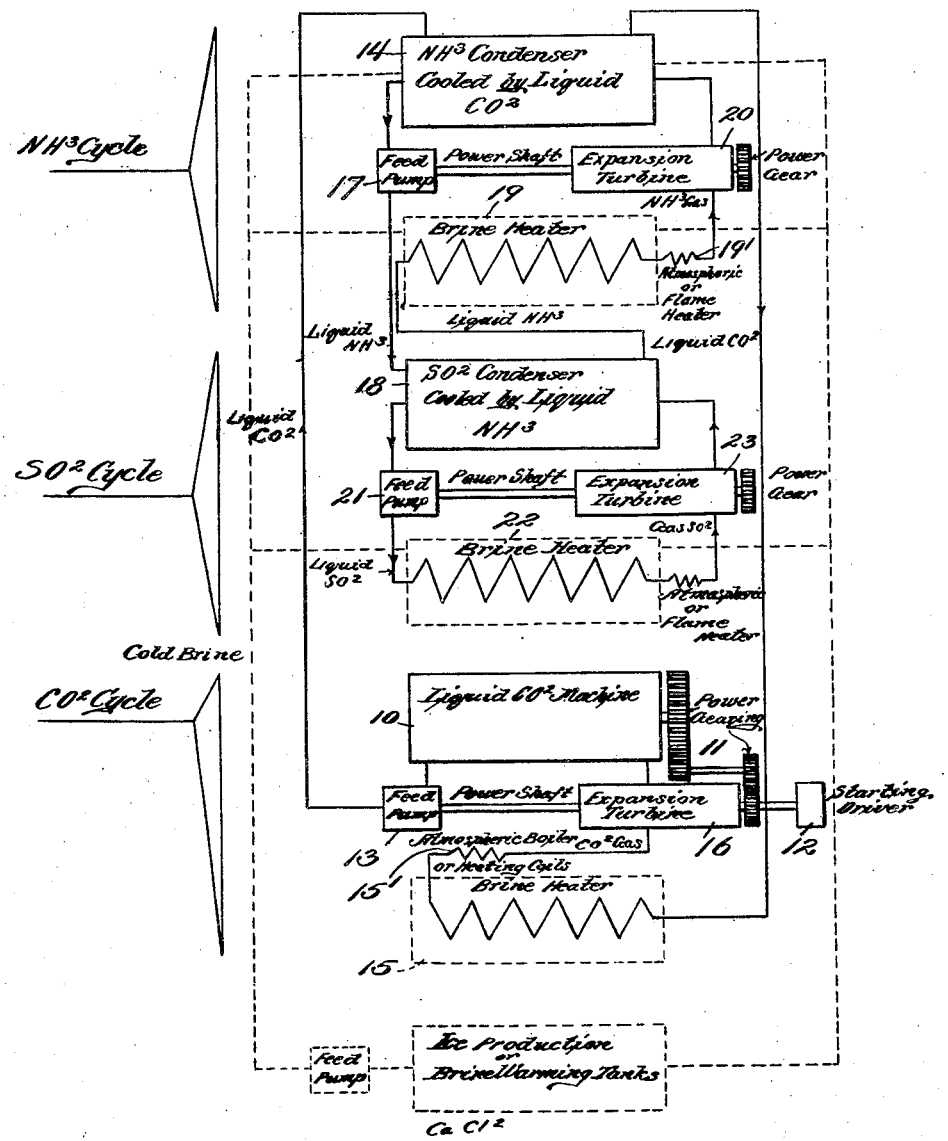

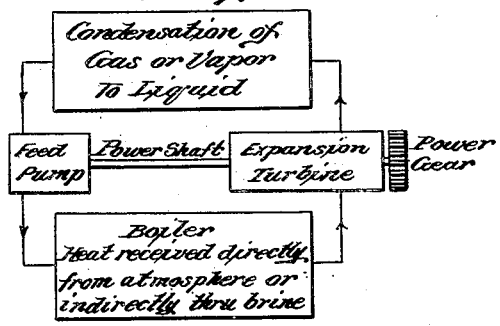
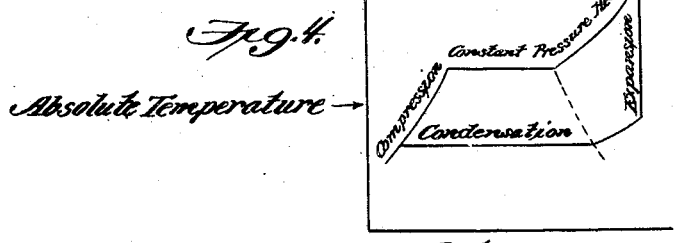
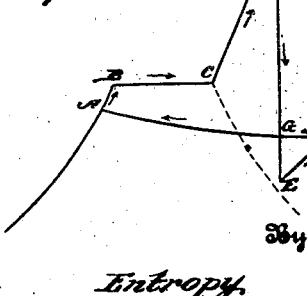

1,519,353

UNITED STATES PATENT OFFICE.

WILLIAM SPENCER BOWEN AND HORACE DUMARS, OF NEW YORK, N. Y., ASSIGNORS, BY DIRECT AND MESNE ASSIGNMENTS, TO BOWEN-DUMARS POWER CORPORATION, OF NEW YORK, N. Y., A CORPORATION OF NEW YORK.

REFRIGERATION AND POWER SYSTEM.

Application filed August 31, 1920. Serial No. 407,114.

*To all whom it may concern:*

Be it known the we, WILLIAM SPENCER BOWEN and HORACE DUMARS, citizens of the United States, residing at New York, in the county of New York and State of New York, have invented new and useful Improvements in Refrigeration and Power Systems, of which the following is a specification.

Our invention relates to a refrigeration and power system in which a liquefied gas is converted into a gas under pressure and allowed to expand and do work while expanding whereby the gas loses heat and reconverting the expanded gas into a liquid. This is known as the Rankine cycle.

This gas which has a lower liquefaction temperature than the other gases employed in our improved method may be liquefied after it has expanded in doing work, by the ordinary regenerative method of subjecting the gas to the temperature of the expanding uncondensed vapor. Other gases having higher liquefaction temperatures are also utilized but it is not necessary to employ the regenerative method in liquefying them since they may be liquefied by passing through a condenser cooled by the liquid gas having a lower liquefaction temperature. These other liquid gases are also converted into a gaseous state and allowed to expand in doing work thereby lowering their temperatures after which they are subjected to temperature of the condenser containing the liquid gas of next lower liquefaction temperature and thereby converted into liquids.

Reference will be made in the following specification to the accompanying drawings, in which:—

Figure 1 is a plan of our invention with the various structural elements conventionally represented.

Figure 2 is a diagrammatic view illustrating the method of carrying our invention into practice.

Figures 3 and 4 represent respectively what may be termed mechanical and thermal cycles, Figure 4 representing the thermal cycle of ammonia and sulphur dioxide.

Figure 5 represents the thermal cycle for carbon dioxide.

Referring first to Figures 1 and 2, it may be stated by way of explanation, that a liquid gas such as carbon dioxide may be produced by any of the usual liquefying machines or methods, preferably the system employing regenerative cooling and the liquid gas thus obtained is contained within a condenser 10. The machine for thus converting the $CO_2$ into a liquid being driven by the gearing illustrated at 11, (Figure 2) operated from the driven pulley 12 or operated directly by pulley 12 shown in Figure 1. The liquid carbon dioxide is drawn from the condenser by the feed pump 13 and forced through the second condenser 14 for the purpose of cooling ammonia and converting the same into a liquid as will hereinafter appear.

From condenser 14 the liquid carbon dioxide is passed through a heater 15 which may be in the form of a group of coils subjected to the heat of a brine solution or it may be an atmospheric or flame heater as indicated at 15' of Figure 1 or a combination of all three or any two of them. The result obtained is that the liquid carbon dioxide is converted into a gas and may be compared to steam which has been derived from water heated above the boiling point. The advantage of the use of liquid gas over that of steam in prime movers comes from the fact that the upper temperature limit for the same range of temperature is very low as compared with that for steam thus giving a higher theoretical thermal efficiency.

Carbon dioxide liquid when subjected to the heat of brine and the heat of the atmosphere or the heat of a flame will become a vapor or gas. This vapor or gas is expanded down to a low temperature and pressure by passing the same through an expansion turbine 16. As the gas expands nearly adiabatically, its temperature will fall. After expansion, the cold, low pressure vapor or gas is passed through the cooling jacket of the compressor 10. From here it is drawn into the compressor and liquefied by compression. The liquid carbon dioxide is drawn off by the feed pump 13 and passed to the ammonia condenser 14. It then flows to the brine and atmospheric or flame heaters, where it again is turned into vapor or gas under high pressure.

Connected with this carbon dioxide cycle is an ammonia cycle of exactly the same nature except that the condenser does not have regenerative features, the liquid carbon dioxide in the condenser 14 acting as the cooling medium. In this case the liquid ammonia is contained within the condenser or reservoir 14 from whence it is drawn by the feed pump 17 and forced through a third condenser 18 wherein it is utilized to cool liquid $SO_2$, from which the ammonia gas is passed through a coil subjected to the heat of a brine solution 19 and an atmospheric heater 19′, and then used expansively in the turbine 20 thereby lowering the temperature and pressure of the gas. The exhaust from the turbine being partially in liquefied form is converted again into a liquid by being passed into the condenser 14 cooled by liquid carbon dioxide when it is again subjected to the operations above described in a closed cycle.

A sulphur dioxide cycle is also represented in which the liquid ammonia acts as a cooling medium in the condenser 18. The liquid $SO_2$ is drawn from the condenser 18 by means of the feed pump 21 and from thence passes through the brine heater 22 or heat coils 22′ where it is converted into a gas and utilized subsequently in the turbine 23, the exhaust from which passes back into the condenser 18 where it is converted into a liquid.

The heating coil 19 is preferably immersed in a brine solution of sodium or calcium chloride and the liquid ammonia passing therethrough cools the brine sufficiently for use in connection with the manufacture of ice which latter also aids in heating the brine relatively to the liquid ammonia so that the latter may be converted into a gas in the heater 19 and 19′.

In Figure 5 the line A—B represents the action of the feed pump, B—C—D the constant pressure heating which changes the liquid to a gas and "superheats" the gas, D—E the adiabatic expansion, E—F constant pressure heating and F—G—A compression of the gas and its conversion to a liquid.

It will be apparent from the above description that our invention converts liquids into gases and uses them expansively in doing useful work, and the liquefying temperature of the gases is sufficiently low so that when in a liquid state they may be used in cooling brine for refrigerating purposes. This arrangement affords a very economical and efficient process and mechanism capable of commercial application.

It is evident that those skilled in the art may vary the arrangement of parts without departing from the spirit of the invention as indicated by the scope of the appended claims.

Having described our invention what we claim as new and desire to secure by Letters Patent, is:—

1. The process of utilizing gases having lower liquefaction temperatures than normal atmospheric temperatures and having different liquefaction temperatures, which consists in liquefying said gases, regasifying them under pressure, expanding them in the gasified state to do useful work, and reliquefying all of the gases except the one having the lowest liquefaction temperature by passing each through the liquefied gas of next lower liquefaction point and liquefying the gas of lowest liquefaction point by subjecting it to the temperature of its expanding uncondensed vapor and applying thereto power from an external source.

2. The herein described process of utilizing gases which consists in expanding one gas having a lower liquefaction temperature than normal atmospheric temperature, utilizing such gas to do useful work and cooling such gas after expansion, by a gas having a still lower liquefaction temperature and liquefying the gas of lowest liquefaction temperature by subjecting it to the temperature of its expanding uncondensed vapor and applying thereto power from an external source.

3. The closed cycle of utilizing gases having a lower liquefying temperature than normal atmospheric temperature which consists in vaporizing sulphur dioxide from a liquid state, expanding the gas to do useful work, reliquefying the gas by passing it through liquefied ammonia and subsequently gasifying the sulphur dioxide again, gasifying the ammonia, utilizing the expanding ammonia gas to do work, reliquefying said expanded gas by passing it through liquefied carbon dioxide, again expanding the ammonia gas and repeating the cycle of operations, and maintaining a supply of liquefied carbon dioxide in said closed cycle by applying power thereto from an external source.

4. The process of utilizing gases to perform useful work and for refrigerating purposes which consists in liquefying gases having different liquefaction temperatures, regasifying them under pressure by bringing them into heat interchanging relation with brine of a higher temperature, expanding the gases to do useful work, reliquefying by passing each through the liquefied gas of next lower liquefaction point, reliquefying the gas having the lowest liquefaction temperature by subjecting it to the temperature of its expanding uncondensed vapor, and applying thereto power from an external source and utilizing the brine, cooled by said gases, in the manufacture of ice.

5. The process of utilizing gases to perform useful work which consists in liquefying gases having different liquefaction temperatures, regasifying them under pressure by bringing them into heat interchanging relation with the atmosphere, expanding the gases to do useful work, and reliquefying each of them except the gas having the lowest liquefaction temperature by passing each through the liquefied gas of next lower liquefaction point, and reliquefying the gas of lowest temperature by subjecting said gas to the temperature of the expanding uncondensed vapor and by the application thereto of power from an external source.

6. The process of utilizing gases to perform useful work and for refrigerating purposes which consists in liquefying gases having different liquefaction temperatures, regasifying them under pressure by bringing them into heat interchanging relation with brine of a higher temperature and with the atmosphere expanding the gases to do useful work, reliquefying each of them but the one having the lowest liquefaction temperature by passing each through the liquefied gas of next lower liquefaction point, liquefying the one having the lower liquefaction temperature by subjecting it to the temperature of its expanding uncondensed vapor and applying thereto power from an external source and utilizing the brine for refrigerating purposes.

7. The process of utilizing carbon dioxide gas which consists in liquefying said gas, forcing said liquid into heat exchanging relation with gaseous ammonia, applying external heat to the liquid for regasifying the same, expanding the gas adiabatically in doing useful work, reliquefying the carbon dioxide gas by subjecting it to the temperature of its expanding uncondensed vapor and by the application thereto of power from an external source and repeating the cycle of operations.

8. The process of utilizing the adiabatic expansion of a plurality of gases having different liquefaction temperatures for the purpose of getting power therefrom which consists in, passing each of said gases separately through the phases of a Rankine cycle, placing said cycles into heat interchanging relation with one another in the order of the respective liquefaction temperatures of the gases, at such a point in said cycles that a gas of higher temperature is liquefied by passing it in heat exchanging relation with a liquefied gas of next lower liquefaction temperature, passing the gas in each cycle during the expansion phase of each cycle through an engine and assisting in the liquefying of the gas of the lowest liquefaction temperature by the application thereto of a power from an external source.

9. The process of refrigeration which consists in liquefaction, gasification, and expansion of a plurality of different gases arranged in an interlocked series of cycles by means of the compression liquefaction, gasification and expansion of a single one of said gases.

10. The process of refrigeration which consists in arranging a plurality of different gases in a series of interlocked cycles, and causing one of said gases to pass through a cycle of compression, liquefaction, gasification and expansion phases whereby said other gases are caused to pass through a cycle of liquefaction, gasification and expansion without being subject to a compression phase.

In testimony whereof we have hereunto set our hands in presence of two subscribing witnesses.

WILLIAM SPENCER BOWEN.
HORACE DUMARS.

Witnesses:
CHAS. J. WILLIS,
LESTER STORK.